United States Patent
Musselman et al.

(10) Patent No.: US 11,029,668 B2
(45) Date of Patent: Jun. 8, 2021

(54) SYSTEMS AND METHODS FOR CALIBRATING SCALAR FIELD CONTRIBUTION VALUES FOR A LIMITED NUMBER OF SENSORS INCLUDING A TEMPERATURE VALUE OF AN ELECTROSTATIC CHUCK AND ESTIMATING TEMPERATURE DISTRIBUTION PROFILES BASED ON CALIBRATED VALUES

(71) Applicant: LAM RESEARCH CORPORATION, Fremont, CA (US)

(72) Inventors: Marcus Musselman, Oakland, CA (US); Andrew D. Bailey, III, Pleasanton, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 16/506,386

(22) Filed: Jul. 9, 2019

(65) Prior Publication Data

US 2019/0332094 A1 Oct. 31, 2019

Related U.S. Application Data

(63) Continuation of application No. 14/860,009, filed on Sep. 21, 2015, now Pat. No. 10,386,821.

(Continued)

(51) Int. Cl.
*G05B 19/418* (2006.01)
*G01K 15/00* (2006.01)
*G01K 3/06* (2006.01)

(52) U.S. Cl.
CPC ............. *G05B 19/418* (2013.01); *G01K 3/06* (2013.01); *G01K 15/005* (2013.01); *G05B 2219/2602* (2013.01); *G05B 2219/45031* (2013.01)

(58) Field of Classification Search
CPC ............................ G05B 19/418; G01K 15/005
See application file for complete search history.

(56) References Cited

U.S. PATENT DOCUMENTS

| 4,503,335 A | 3/1985 | Takahashi |
| 5,475,610 A | 12/1995 | Atwood et al. |

(Continued)

OTHER PUBLICATIONS

Definition of "correspond", http://www.merriam-webster.com (2020). (Year: 2020).*

(Continued)

*Primary Examiner* — Michele Fan

(57) ABSTRACT

A system includes sensors, an interface and a controller. The interface receives feedback signals from the sensors. At least some of the sensors are disposed in an electrostatic chuck. The feedback signals are indicative respectively of fields of a heating plate of the electrostatic chuck. The controller, based on the fields and sets of calibration values, estimates values of a first field respectively for multiple points on a substrate. Each of the sets of calibration values corresponds respectively to one of multiple actuators. The calibration values, in each of the sets of calibration values, define amounts of contribution provided by a respective one of the actuators to the first field for the points. The controller changes physical states of the actuators based on the estimated values of the first field of the points to provide a predetermined temperature distribution profile across the electrostatic chuck.

20 Claims, 6 Drawing Sheets

Related U.S. Application Data

(60) Provisional application No. 62/182,877, filed on Jun. 22, 2015.

(56) References Cited

U.S. PATENT DOCUMENTS

| | | | |
|---|---|---|---|
| 5,667,622 A | | 9/1997 | Hasegawa et al. |
| 5,810,933 A | | 9/1998 | Mountsier et al. |
| 5,881,208 A | * | 3/1999 | Geyling ............ H01L 21/67103 |
| | | | 392/418 |
| 6,091,060 A | | 7/2000 | Getchel et al. |
| 6,191,394 B1 | | 2/2001 | Shirakawa et al. |
| 6,259,072 B1 | | 7/2001 | Kinnard et al. |
| 6,342,691 B1 | | 1/2002 | Johnsgard et al. |
| 6,644,965 B2 | | 11/2003 | Ookura et al. |
| 6,967,177 B1 | | 11/2005 | May et al. |
| 7,415,312 B2 | | 8/2008 | Barnett, Jr. et al. |
| 7,897,897 B2 | | 3/2011 | Jyousaka et al. |
| 7,952,049 B2 | | 5/2011 | Tsukamoto |
| 8,092,639 B2 | | 1/2012 | Buchber Or, Jr. et al. |
| 8,461,674 B2 | | 6/2013 | Gaff et al. |
| 8,546,732 B2 | | 10/2013 | Singh |
| 8,587,113 B2 | | 11/2013 | Gaff et al. |
| 8,608,900 B2 | | 12/2013 | Buchberger, Jr. et al. |
| 8,624,168 B2 | | 1/2014 | Gaff et al. |
| 8,637,794 B2 | | 1/2014 | Singh et al. |
| 8,642,480 B2 | | 2/2014 | Gaff et al. |
| 8,680,441 B2 | | 3/2014 | Singh |
| 8,691,598 B1 | | 4/2014 | McWhirter et al. |
| 8,755,204 B2 | | 6/2014 | Benjamin |
| 8,791,392 B2 | | 7/2014 | Singh |
| 8,809,747 B2 | | 8/2014 | Pease et al. |
| 8,809,774 B2 | | 8/2014 | Vertes et al. |
| 8,852,964 B2 | | 10/2014 | Kimura et al. |
| 8,884,194 B2 | | 11/2014 | Singh et al. |
| 9,089,007 B2 | | 7/2015 | Yang et al. |
| 9,123,755 B2 | | 9/2015 | Swanson et al. |
| 9,245,768 B2 | | 1/2016 | Aderhold |
| 9,779,974 B2 | | 10/2017 | Zhang et al. |
| 2001/0019741 A1 | | 9/2001 | Inaba et al. |
| 2002/0003037 A1 | | 1/2002 | Cousineau et al. |
| 2002/0030047 A1 | | 3/2002 | Shao et al. |
| 2002/0062954 A1 | | 5/2002 | Getchel et al. |
| 2003/0029834 A1 | | 2/2003 | Lill et al. |
| 2003/0155939 A1 | | 8/2003 | Lutz et al. |
| 2003/0186545 A1 | | 10/2003 | Kamp et al. |
| 2004/0012404 A1 | | 1/2004 | Feder et al. |
| 2004/0156625 A1 | | 8/2004 | Garmer et al. |
| 2004/0266200 A1 | | 12/2004 | Schaller et al. |
| 2005/0098535 A1 | | 5/2005 | Lansford et al. |
| 2005/0099758 A1 | | 5/2005 | Kellerman et al. |
| 2005/0173403 A1 | | 8/2005 | Benjamin et al. |
| 2006/0051077 A1 | | 3/2006 | Kubo |
| 2006/0084188 A1 | | 4/2006 | You et al. |
| 2007/0251456 A1 | | 11/2007 | Herchen et al. |
| 2008/0023656 A1 | | 1/2008 | Quach et al. |
| 2008/0073335 A1 | | 3/2008 | Tsukamoto |
| 2008/0142500 A1 | | 6/2008 | Tomita et al. |
| 2008/0170969 A1 | | 7/2008 | Yoshioka et al. |
| 2008/0230866 A1 | | 9/2008 | Kulp |
| 2008/0280451 A1 | | 11/2008 | Ohmoto et al. |
| 2009/0008381 A1 | | 1/2009 | Jyousaka et al. |
| 2009/0110824 A1 | | 4/2009 | Takenaga et al. |
| 2010/0332013 A1 | | 12/2010 | Choi et al. |
| 2011/0143462 A1 | | 6/2011 | Gaff et al. |
| 2011/0186545 A1 | | 8/2011 | Mahadeswaraswamy et al. |
| 2012/0112068 A1 | | 5/2012 | Maeda et al. |
| 2012/0185103 A1 | | 7/2012 | Blair et al. |
| 2013/0167769 A1 | | 7/2013 | Shamoun |
| 2014/0073066 A1 | | 3/2014 | Tabuchi |
| 2014/0154819 A1 | | 6/2014 | Gaff et al. |
| 2014/0166632 A1 | | 6/2014 | McWhirter et al. |
| 2014/0220709 A1 | | 8/2014 | Kimura et al. |
| 2015/0060013 A1 | | 3/2015 | Buchberger, Jr. |
| 2015/0071623 A1 | | 3/2015 | Ranish |
| 2015/0132863 A1 | | 5/2015 | Oohashi |
| 2015/0170917 A1 | | 6/2015 | Ho et al. |
| 2015/0170934 A1 | | 6/2015 | Aderhold |
| 2015/0176928 A1 | | 6/2015 | Tabuchi |
| 2015/0340255 A1 | | 11/2015 | Parkhe et al. |
| 2016/0027678 A1 | | 1/2016 | Parkhe et al. |
| 2016/0086818 A1 | | 3/2016 | Hamano et al. |
| 2016/0225645 A1 | | 8/2016 | Koizumi et al. |
| 2016/0345384 A1 | | 11/2016 | Zhang et al. |
| 2016/0370788 A1 | | 12/2016 | Bailey, III et al. |
| 2017/0133251 A1 | | 5/2017 | Wu et al. |
| 2017/0215230 A1 | | 7/2017 | Parkhe |

OTHER PUBLICATIONS

U.S. Appl. No. 14/859,951, filed Sep. 21, 2015, Benny Wu.
U.S. Appl. No. 14/860,009, filed Sep. 21, 2015, Marcus Musselman.
U.S. Appl. No. 14/860,078, filed Sep. 21, 2015, Marcus Musselman.

* cited by examiner

SYSTEMS AND METHODS FOR CALIBRATING SCALAR FIELD CONTRIBUTION VALUES FOR A LIMITED NUMBER OF SENSORS INCLUDING A TEMPERATURE VALUE OF AN ELECTROSTATIC CHUCK AND ESTIMATING TEMPERATURE DISTRIBUTION PROFILES BASED ON CALIBRATED VALUES

CROSS-REFERENCE TO RELATED APPLICATIONS

The present disclosure is a continuation of U.S. patent application Ser. No. 14/860,009 filed on Sep. 21, 2015, which claims the benefit of U.S. Provisional Application No. 62/182,877, filed on Jun. 22, 2015. The entire disclosures of the applications referenced above are incorporated herein by reference.

FIELD

The present disclosure relates to substrate processing systems, and more particularly to systems and methods for controlling temperatures of an electrostatic chuck in a substrate processing system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems may be used to perform etching, deposition, and/or other treatment of substrates such as semiconductor wafers. Example processes that may be performed on a substrate include, but are not limited to, a plasma enhanced chemical vapor deposition (PECVD) process, a chemically enhanced plasma vapor deposition (CEPVD) process, a sputtering physical vapor deposition (PVD) process, an ion implantation process, and/or other etch, deposition, and cleaning processes. A substrate may be arranged on a pedestal, an electrostatic chuck (ESC), etc. in a processing chamber of the substrate processing system. For example, during etching in a PECVD process, a gas mixture including one or more precursors is introduced into the processing chamber and plasma is struck to etch the substrate.

During processing of a substrate, temperatures of the substrate and components of the substrate processing system may vary. These temperature variations may have undesirable effects on the resulting substrates (e.g., non-uniform critical dimensions). Accordingly, the substrate processing systems may implement systems and methods for controlling temperatures of the substrate and the components of the substrate processing system.

SUMMARY

A system is provided and includes a controller, an interface, and a calibration controller. The controller is configured to (i) select a set of fields, and (ii) based on the set of fields, supply control effort to first actuators in zones of a chamber. The interface is configured to receive feedback signals from sensors. The feedback signals are indicative of fields respectively of the zones. The controller is configured to adjust an amount of control effort supplied to the actuators based on the fields. The calibration controller is configured to, based on the fields, generate calibration values for each of the sensors. The calibration values for each of the sensors are indicative of field contributions corresponding respectively to the actuators.

In other features, a system is provided and includes: a chamber, a first controller, a second controller and an interface. The chamber includes sensor elements. The first controller is configured to select a predetermined set of fields. The second controller is configured to adjust parameters of actuators based on the predetermined set of fields. The interface is configured to receive feedback signals from the sensor elements. The feedback signals are indicative of respectively fields of the heating plate. The first controller is configured to estimate a first field of a substrate based on the fields and a set of calibration values. The set of calibration values are indicative of an effect of the actuators respectively from the actuators.

In other features, a method is provided and includes: selecting a set of fields; based on the set of fields, supplying control effort to actuators in zones in the chamber; receiving, via an interface, feedback signals from sensors, where the feedback signals are indicative of fields respectively of the zones; adjusting an amount of control effort supplied to the actuators based on the fields; and based on the fields, generate calibration values for each of the sensors, where the calibration values for each of the sensors are indicative of an effect of actuation corresponding respectively to the actuators.

In other features, a method for processing a substrate in a chamber is provided. The chamber includes an actuation system. The actuation system includes sensor elements. The method includes: selecting a predetermined set of fields; adjusting parameters of actuators based on the predetermined set of fields; and receiving, via an interface, feedback signals from the sensor elements, where the feedback signals are indicative of respectively fields of the chamber. The method further includes estimating a first field of a substrate based on the fields and a set of calibration values. The first set of calibration values are indicative of an effect of actuation corresponding respectively from the actuators.

In other features, a system is provided and includes a first controller, first interface, and a calibration controller. The first controller is configured to (i) select a first set of temperatures, and (ii) based on the first set of temperatures, supply current to first thermal control elements in first zones of a heating plate of an electrostatic chuck. The first interface is configured to receive feedback signals from first sensors. The feedback signals are indicative of first temperatures respectively of the first zones. The first controller is configured to adjust an amount of current supplied to the first thermal control elements based on the first temperatures. The calibration controller is configured to, based on the first temperatures, generate calibration values for each of the first sensors. The calibration values for each of the first sensors are indicative of thermal energy contributions corresponding respectively to the first thermal control elements.

In other features, the system further includes a sensor array interface configured to receive second feedback signals from second sensors in a sensor array. The second feedback signals are indicative of second temperatures in second zones of the heating plate. The sensor array is on the electrostatic chuck. The calibration controller is configured to, based on the second temperatures, generate the calibration values for each of the first sensors.

In other features, the calibration controller is configured to determine azimuthally averaged temperatures. Each of the azimuthally averaged temperatures is based on corresponding group of the second temperatures. In other features, each of the groups of the second temperatures is indicated by ones of the second sensors that is at a same radius of the sensor array.

In other features, the radii corresponding to the azimuthally averaged temperatures match radii of the first sensors relative to a center of the electrostatic chuck. In other features, some of the radii corresponding to the azimuthally averaged temperatures do not match radii of the first sensors relative to the electrostatic chuck.

In other features, the calibration controller is configured to select the some of the radii corresponding to the azimuthally averaged temperatures that do not match radii of the first sensors relative to the electrostatic chuck.

In other features, the calibration controller is configured to (i) select points on the sensor array or top surface of the electrostatic chuck, (ii) estimate temperatures at the selected points based on the second temperatures, and (iii) determine the calibration values based on the estimated temperatures at the selected points.

In other features, the calibration controller is configured to (i) select points on the sensor array or top surface of the electrostatic chuck, and (ii) estimate temperatures at the selected points based on the second temperatures. The first controller is configured to adjust the amount of current supplied to the first thermal control elements based on the estimated temperatures and a predetermined criterion.

In other features, the first zones are concentric zones. The system further includes a second controller and a sensor array interface. The second controller configured to, based on the first set of temperatures or a second set of temperatures, supply current to a second plurality of thermal control elements in a second zones of the heating plate of the electrostatic chuck. The sensor array interface is configured to receive second feedback signals from second sensors of a sensor array. The second feedback signals are indicative of second temperatures of the second zones in the heating plate. The second controller is configured to adjust an amount of current supplied to the second thermal control elements based on the second temperatures. The calibration controller is configured to, based on the second temperatures, generate the calibration values for each of the first sensors.

In other features, the first zones include the second zones. In other features, the system further includes the electrostatic chuck, and the sensor array.

In other features, a system is provided and includes an electrostatic chuck, a first controller, a second controller, and a first interface. The electrostatic chuck includes a heating plate, where the heating plate includes a plurality of sensor elements. The first controller is configured to select a first predetermined set of temperatures. The second controller configured to adjust parameters of first thermal control elements based on the first predetermined set of temperatures. The first interface is configured to receive first feedback signals from the sensor elements. The first feedback signals are indicative of respectively first temperatures of the heating plate. The first controller is configured to estimate a first temperature of a substrate based on the first temperatures and a first set of calibration values. The first set of calibration values are indicative of thermal energy contributions respectively from the first thermal control elements.

In other features, the first controller is configured to estimate temperatures of the substrate based on the first temperatures and sets of calibration values. The temperatures of the substrate include the first temperature. The sets of calibration values include the first set of calibration values. The calibration values for each of the sensor elements are indicative of thermal energy contributions corresponding respectively to the first thermal control elements.

In other features, the first controller is configured to (i) select a point at a radius, where the radius is different than radii corresponding to locations of the sensor elements in the heating plate, (ii) estimate an azimuthally averaged temperature of the selected point based on the estimates of the temperatures, and (iii) estimate the first temperature of the substrate based on the azimuthally averaged temperature.

In other features, the system further includes a third controller configured to adjust parameters of a second thermal control elements based on a second predetermined set of temperatures. The heating plate includes the second thermal control elements. The first controller is configured to select the second predetermined set of temperatures.

In other features, the second controller is configured to coarsely adjust the first temperature of the substrate by adjusting the parameters of the first thermal control elements. The third controller is configured to finely adjust the first temperature of the substrate by adjusting the parameters of the second thermal control elements. A temperature range over which the coarse adjustment occurs is greater than a temperature range over which the fine adjustment occurs.

In other features, the first controller is configured to estimate a temperatures of the substrate based on the first temperatures and sets of calibration values. The temperatures of the substrate include the first temperature. The sets of calibration values include the first set of calibration values. The calibration values for each of the sensor elements are indicative of thermal energy contributions corresponding respectively to the first thermal control elements and the second thermal control elements.

In other features, a method is provided and includes: selecting a first set of temperatures; based on the first set of temperatures, supplying current to first thermal control elements in first zones of a heating plate of an electrostatic chuck; receiving, via a first interface, feedback signals from first sensors, where feedback signals are indicative of first temperatures respectively of the first zones; adjusting an amount of current supplied to the first thermal control elements based on the first temperatures; and based on the first temperatures, generate calibration values for each of the first sensors, where calibration values for each of the first sensors are indicative of thermal energy contributions corresponding respectively to the first thermal control elements.

In other features, the method further includes: receiving second feedback signals from second sensors in a sensor array, where the second feedback signals are indicative of second temperatures in second zones of the heating plate, and where the sensor array is on the electrostatic chuck; and based on the second temperatures, generating the calibration values for each of the first sensors.

In other features, the method further includes determining azimuthally averaged temperatures. Each of the azimuthally averaged temperatures are based on corresponding group of the second temperatures.

In other features, each of the groups of the second temperatures is indicated by ones of the second sensors that is at a same radius of the sensor array. In other features, the radii corresponding to the azimuthally averaged temperatures match radii of the first sensors relative to a center of the electrostatic chuck. In other features, some of the radii corresponding to the azimuthally averaged temperatures do not match radii of the first sensors relative to the electrostatic chuck.

In other features, the method further includes selecting the some of the radii corresponding to the azimuthally averaged temperatures that do not match radii of the first sensors relative to the electrostatic chuck.

In other features, the method further includes: selecting points on the sensor array or top surface of the electrostatic chuck; estimating temperatures at the selected points based on the second temperatures; and determining the calibration values based on the estimated temperatures at the selected points.

In other features, the method further includes: selecting points on the sensor array or top surface of the electrostatic chuck; estimating temperatures at the selected points based on the second temperatures; and adjusting the amount of current supplied to the first thermal control elements based on the estimated temperatures and a predetermined criteria.

In other features, the first zones are concentric zones. In other features, the method further includes: based on the first set of temperatures or a second set of temperatures, supplying current to second thermal control elements in second zones of the heating plate of the electrostatic chuck; receiving second feedback signals from second sensors of a sensor array, where the second feedback signals are indicative of second temperatures of the second zones in the heating plate; adjusting an amount of current supplied to the second thermal control elements based on the second temperatures; and based on the second temperatures, generating the calibration values for each of the first sensors. In other features, the first zones include the second zones.

In other features, a method for processing a substrate on an electrostatic chuck is provided. The electrostatic chuck includes a heating plate. The heating plate includes sensor elements. The method includes: selecting a first predetermined set of temperatures; adjusting parameters of first thermal control elements based on the first predetermined set of temperatures; receiving, via a first interface, first feedback signals from the sensor elements, where the first feedback signals are indicative of respectively first temperatures of the heating plate; and estimating a first temperature of a substrate based on the first temperatures and a first set of calibration values, where the first set of calibration values are indicative of thermal energy contributions respectively from the first thermal control elements.

In other features, the method further includes estimating temperatures of the substrate based on the first temperatures and sets of calibration values. The temperatures of the substrate include the first temperature. The sets of calibration values include the first set of calibration values. The calibration values for each of the sensor elements are indicative of thermal energy contributions corresponding respectively to the first thermal control elements.

In other features, the method further includes: selecting a point at a radius, where the radius is different than radii corresponding to locations of the sensor elements in the heating plate; estimating an azimuthally averaged temperature of the selected point based on the estimates of the temperatures; and estimating the first temperature of the substrate based on the azimuthally averaged temperature.

In other features, the method further includes: adjusting parameters of second thermal control elements based on a second predetermined set of temperatures, where the heating plate includes the second thermal control elements; and selecting the second predetermined set of temperatures.

In other features, the method further includes: coarsely adjusting the first temperature of the substrate by adjusting the parameters of the first thermal control elements; and finely adjusting the first temperature of the substrate by adjusting the parameters of the second thermal control elements, where a temperature range over which the coarse adjustment occurs is greater than a temperature range over which the fine adjustment occurs.

In other features, the method further includes estimating temperatures of the substrate based on the first temperatures and sets of calibration values. The temperatures of the substrate include the first temperature. The sets of calibration values include the first set of calibration values. The calibration values for each of the sensor elements are indicative of thermal energy contributions corresponding respectively to the first thermal control elements and the second thermal control elements.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
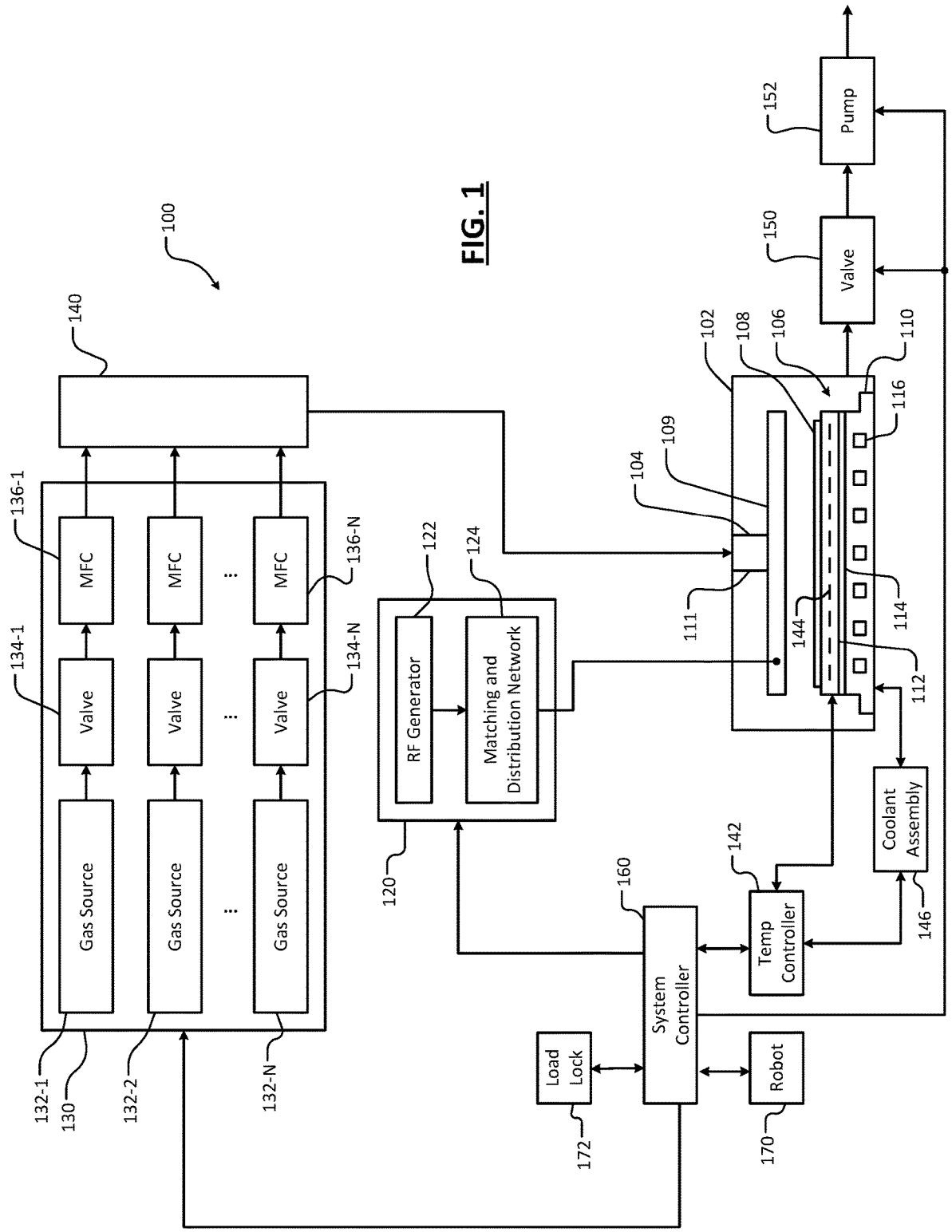
FIG. 1 is a functional block diagram of a substrate processing system incorporating a temperature controller in accordance with an embodiment of the present disclosure.

Variations in the manufacturing of heating plates can cause corresponding variations (i.e., non-uniformities) in operating characteristics of the heating plates. The variations in operating characteristics of the heating plates results in performance variations of a substrate processing system in controlling temperatures of zones of the heating plates. Characteristic variations in heating plates may include, but are not limited to, differences in thicknesses of silicone bond layers, differences in the flatness of machined surfaces, and/or differences in characteristics of TCEs within the heating plates. These non-uniformities may result in local differences in heat transfer (i.e., local temperature non-uniformity), and therefore non-uniformities in substrate temperatures. Differences can also exist between ESCs and between processing chambers. Thus, there can be a substantial amount of variability between processing a substrate in a first processing chamber with a first ESC and processing the same substrate in a second processing chamber with a second ESC.

In a substrate processing system, temperatures of an electrostatic chuck (ESC) may be controlled during substrate processing to control temperatures of the substrate. Different substrate processes may have respective temperature requirements for one or more areas of corresponding substrates. Contact surface temperatures of the ESC may be controlled to maintain the one or more areas of the substrates at selected temperatures to satisfy the temperature requirements. As an example, an ESC may include a heating plate. The heating plate may include multiple TCEs. Current to the TCEs may be controlled to control temperatures of one or more zones, which in turn controls temperatures of one or more areas of a substrate.

As another example, a substrate processing system may include a heating plate having four concentric zones with four respective TCEs. The substrate processing system may implement a temperature control method to control temperatures of the concentric zones. Four temperature probes (or sensors) may be used to monitor respective temperatures of the concentric zones. Each of the temperature probes may be used to detect a temperature of the heating plate in an area where the temperature probe is located. One or more controllers may be used to monitor the temperatures detected by the temperature probes and adjust current to the TCEs to regulate and/or adjust temperatures of the concentric zones. This example temperature control method has limited accuracy and control over temperatures across each of the concentric zones for multiple reasons. The temperature control method does not account for thermal energy transfer contributions of each of the TCEs in each of the four zones. The temperature control method also has limited control as to temperatures across each of the zones, since a limited number of temperature probes and TCEs are provided and/or controlled.

Continuing with the same example, a sensor array may be used to calculate calibration values for use in estimating substrate temperatures corresponding to detected temperatures of the temperature probes. The sensor array may include an array of sensors (e.g., 65 sensors) distributed across an ESC. During calibration the sensor array may be placed on the ESC in a similar manner as placing a substrate on the ESC. The substrate processing system may control TCEs of the ESC to provide a predetermined set of temperatures at the temperature probes. The sensor array may then be used to detect temperatures across the ESC. The detected temperatures provide estimates of temperatures of a substrate, for example, if the sensor array were replaced with a substrate. These temperatures collectively are referred to as a temperature distribution profile and correspond to a respective set of temperatures of the temperature probes. Multiple sets of temperatures of the temperature probes may be implemented as part of respective cycles to provide a temperature distribution profile of the sensor array or substrate per cycle.

Calibration values may be determined based on the probe temperatures and the temperature distribution profiles. The calibration values may be determined using one or more of the following equations 1-2, where: $PV_{i,p}$ refers to a temperature detected by a temperature probe for an $i^{th}$ cycle; p identifies a number of a temperature probe; $BP_i$ is a base plate temperature; $APV_{i,p}$ is an azimuthally averaged temperature from the sensor array for a radius associated with a tip of a corresponding temperature probe relative to a center of the heating plate and/or ESC; $SPAN_{x,y,p}$ refers to a calibration value for the $p^{th}$ temperature probe that is indicative of an amount of thermal energy and/or temperature contributed by the $y^{th}$ TCE at the $p^{th}$ temperature probe; y may also be indicative of the column of a corresponding calibration matrix; x may refer to the $x^{th}$ row of the corresponding calibration matrix and may be the same as p; $OFFSET_p$ is a calibration offset value that corresponds to the $p^{th}$ temperature probe; and $SPAN_{2,p}$ refers to a calibration value that corresponds to the $p^{th}$ temperature probe and is indicative of a thermal energy and/or temperature loss due to the base plate.

$$\begin{bmatrix} 1 & PV_{1,p} & BP_i \\ 1 & PV_{2,p} & BP_i \\ 1 & PV_{3,p} & BP_i \end{bmatrix} * \begin{bmatrix} OFFSET_p \\ SPAN_{1:p,p} \\ SPAN_{2:p} \end{bmatrix} = \begin{bmatrix} APV_{1,p} \\ APV_{2,p} \\ APV_{3,p} \end{bmatrix} \rightarrow X_p * \beta_p = Y_p \quad (1)$$

$$\beta_p = (X_p^T * X_p)^{-1} * X_p^T * Y_p \quad (2)$$

An azimuthally average temperature refers to an average of temperatures detected by sensors of the sensor array, which are on, closest to and/or proximate the radius of the corresponding temperature probe. In equation 2, T refers to the transpose function.

The calibration values may be used to estimate temperatures $T_{i,p}$ of a substrate being processed using equation 3, where $T_{i,p}$ is the temperature of a substrate in an area above a $p^{th}$ temperature probe.

$$\begin{bmatrix} T_{1,i} \\ T_{2,i} \\ T_{3,i} \\ T_{4,i} \end{bmatrix} = \begin{bmatrix} SPAN_{1:1,1} & 0 & 0 & 0 \\ 0 & SPAN_{1:2,2} & 0 & 0 \\ 0 & 0 & SPAN_{1:3,3} & 0 \\ 0 & 0 & 0 & SPAN_{1:4,4} \end{bmatrix} * \begin{bmatrix} PV_{1,i} \\ PV_{2,i} \\ PV_{3,i} \\ PV_{4,i} \end{bmatrix} + \begin{bmatrix} SPAN_{2:1} \\ SPAN_{2:2} \\ SPAN_{2:3} \\ SPAN_{2:4} \end{bmatrix} * BP_i + \begin{bmatrix} OFFSET_1 \\ OFFSET_2 \\ OFFSET_3 \\ OFFSET_4 \end{bmatrix} \quad (3)$$

During calibration, the calibration values are set, such that for each $i^{th}$ cycle and for each temperature probe a difference between $T_{i,p}$ and $APV_{i,p}$ is minimized. Equations 1 and 3 are the same equations, but written in a different format. Equation 1 includes a calibration matrix $\beta_p$, which includes calibration values $OFFSET_p$, $SPAN_{x,y,p}$, $SPAN_{2,p}$ that are represented in respective calibration matrices of equation 3. Equation 3 is shown for an example implementation that includes four temperature probes. Since there are three unknowns ($SPAN_{x,y,p}$, $SPAN_{2,p}$, and $OFFSET_p$) for each row of equation 3, three cycles are performed to provide three sets of values. This is why equation 1 is shown as having matrices with three rows; one row for each cycle.

The zero ('0') entries of the first calibration matrix of equation 3 indicate that contributions by TCEs other than the TCE that is in the zone of a corresponding temperature probe are not accounted for by equation 3. In other words, equation 3 is based on the assumption that the temperature detected at a temperature probe is due only to the thermal energy generated by a corresponding TCE in the area of the temperature probe and not due to thermal energy generated by other TCEs. Thus, this described calibration technique does not account for cross talk of TCEs (or thermal energy transfer from each TCE across a heating plate) as detected by a temperature probe. For this reason, this calibration technique does not account for spatial information of TCEs in an ESC. Also, this calibration technique is restricted to four points or radii (or the number of temperature probes).

Thus, the above-described calibration process does not provide arbitrary temperature measurement locations, but rather is limited to the number of points and/or radii associated with the number of temperature probes. The calibration process does not account for spatial structure of a heating plate of an ESC (i.e. TCE layout of the ESC and corresponding distributed thermal energy contributions) and thus can be inaccurate. The model provided by equations 1-3 is based on an assumption that a temperature of a point on a plane of a wafer, other than a plane in which a tip of a temperature probe is located, is a function of a temperature measurement of only a single point at which the tip of the temperature probe is located. This is a limited model, as the model does not account for temperature distributions on multiple planes as a result of heat transfer. Due to construction of an ESC having finite and non-negligible thermal resistance to heat flow in all directions, the temperature distributions in a heating plate arising from TCEs can result in temperature distributions with different temperatures on each plane of the heating plate. Some of the temperatures may not match temperatures measured by temperature probes. In actuality, a temperature on a point of the heating plate (or on a wafer set on the heating plate) is based on thermal energy provided by all of the TCEs supplying heat to the heating plate and thus is also a function of all of the measurements of all of the temperature probes in the heating plate.

Since ESCs have characteristic heating profiles that vary from ESC to ESC, temperature differences exist between ESCs for a given TCE and/or cooling assembly parameter set. Although radial temperatures measured via probes of a first ESC may match radial temperatures measured via probes of a second ESC, the heating profiles of the ESCs are typically different. This can be true due to for example manufacturing differences regardless of whether the ESCs are of the same type.

The calibration process also does not allow for arbitrary objective criteria (e.g., minimizing temperature errors in one or more selected zones of a heating plate) per ESC and thus is not suitable for ESC matching. ESC matching refers to being able to calibrate a substrate processing system for different ESCs to provide the same temperature distribution across heating plates of each of the ESCs. The calibration process also does not account for unknown differences between processing chambers.

Substrate processing systems and methods are disclosed below, which overcome the above-stated disadvantages of the described calibration process. Calibration methods are disclosed below that account for distributed thermal energy contributions of TCEs with respect to each temperature detected by a temperature probe. The disclosed calibration methods allow for arbitrary objective functions to be used to satisfy different temperature distribution criteria of heating plates. The disclosed calibration methods allow for ESC matching and account for unknown differences between processing chambers.

Referring now to FIG. 1, an example substrate processing system 100 for performing etching using RF plasma is shown. The substrate processing system 100 includes a processing chamber 102. The processing chamber 102 encloses other components of the processing chamber 102 and contains the RF plasma. The processing chamber 102 includes an upper electrode 104 and an ESC 106. During operation, a substrate 108 is arranged on the ESC 106.

For example only, the upper electrode 104 may include a showerhead 109 that introduces and distributes gases. The showerhead 109 may include a stem portion 111 including one end connected to a top surface of the processing chamber 102. The showerhead 109 is generally cylindrical and extends radially outwardly from an opposite end of the stem portion 111 at a location that is spaced from the top surface of the processing chamber 102. A substrate-facing surface of the showerhead 109 includes a plurality of holes through which process or purge gas flows. Alternately, the upper electrode 104 may include a conducting plate and the gases may be introduced in another manner.

The ESC 106 includes a conductive baseplate 110 that acts as a lower electrode. The baseplate 110 supports a heating plate 112, which may be formed at least partially of a ceramic material. A thermal resistance layer 114 may be arranged between the heating plate 112 and the baseplate 110. The baseplate 110 may include one or more coolant channels 116 for flowing coolant through the baseplate 110.

An RF generating system 120 generates and outputs an RF voltage to one of the upper electrode 104 and the lower electrode (e.g., the baseplate 110 of the ESC 106). The other one of the upper electrode 104 and the baseplate 110 may be DC grounded, AC grounded or at a floating potential. For example only, the RF generating system 120 may include an RF voltage generator 122 that generates the RF voltage, which is fed by a matching and distribution network 124 to the upper electrode 104 or the baseplate 110. In other examples, the plasma may be generated inductively or remotely.

A gas delivery system 130 includes one or more gas sources 132-1, 132-2, . . . , and 132-N (collectively gas sources 132), where N is an integer greater than zero. The gas sources 132 supply one or more precursors and mixtures thereof. The gas sources 132 may also supply purge gas. Vaporized precursor may also be used. The gas sources 132 are connected by valves 134-1, . . . , and 134-N (collectively valves 134) and mass flow controllers 136-1, 136-2, . . . , and 136-N (collectively mass flow controllers 136) to a manifold 140. An output of the manifold 140 is fed to the processing chamber 102. For example only, the output of the manifold 140 is fed to the showerhead 109.

Figure 2A:
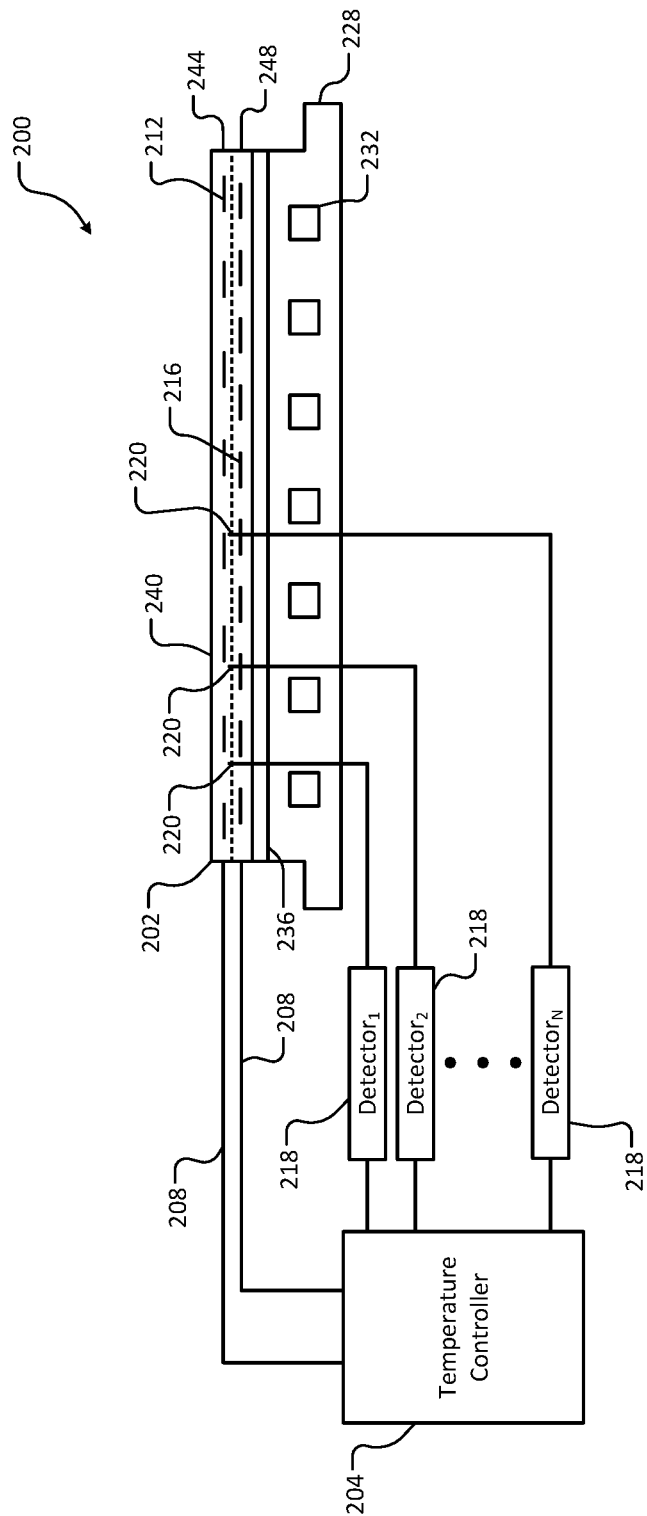
FIG. 2A is a side view of an electrostatic chuck (ESC) and the temperature controller in accordance with an embodiment of the present disclosure.
Figure 2B:
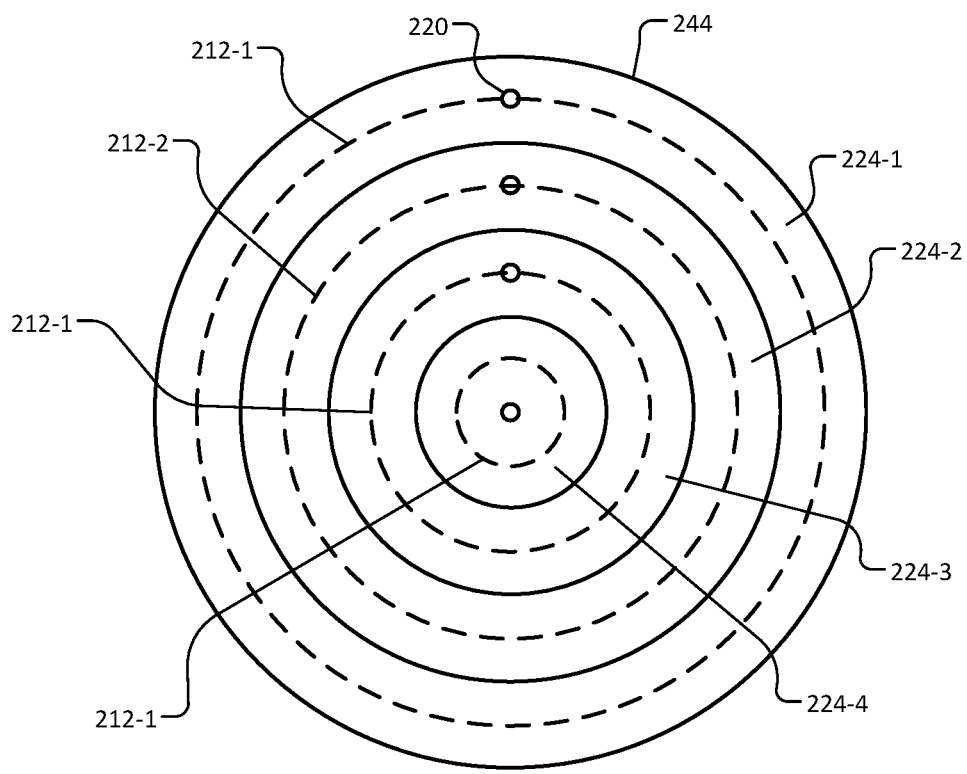
FIG. 2B is a top view of first layer of a heating plate of the ESC including macro thermal control elements (TCEs)

A temperature controller 142 may be connected to TCEs 144 (sometimes referred to as actuators) arranged in the heating plate 112. Although shown separately from a system controller 160, the temperature controller may be implemented as part of the system controller 160. As an example, the TCEs 144 may include, but are not limited to, respective macro TCEs (or first array of TCEs) corresponding to each macro zone of the heating plate 112 and/or micro TCEs (or second array of TCEs) corresponding to each micro zone of the heating plate 112. Examples of the arrays of TCEs are shown in FIGS. 2A and 2B. The macro TCEs may be used for coarse tuning temperatures and/or other fields of macro zones of the heating plate 112. The micro TCEs may be used for fine tuning temperatures and/or other fields of micro zones of the heating plates. The macro zones may include the micro zones. One or more micro zones may overlap two or more of the macro zones. The macro zones and the micro zones may have predetermined, matching, different, or any arbitrary shape.

The heating plate 112 includes multiple temperature controlled zones. Each of the temperature controlled zones has corresponding macro and/or micro TCEs. The macro TCEs are controlled to roughly achieve selected temperatures in each of the respective temperature controlled zones. The micro TCEs may be individually controlled to finely adjust temperatures within the respective temperature controlled zones and/or to compensate for temperature non-uniformities in each temperature controlled zone. For example, for each setpoint temperature of a macro TCE, a temperature distribution response across a top surface of the heating plate 112 may be known and mapped (i.e., stored in memory). Similarly, a temperature distribution response of each of the micro TCEs across the surface of the heating plate 112 may be known and mapped. Although the systems and methods disclosed herein are described with respect to multi-zone heating plates and/or ESCs, the principles of the present disclosure may be applied to other temperature-controlled components of a substrate processing system.

The temperature controller 142 may control operation and thus temperatures of the TCEs 144 to control temperatures of the ESC 106 and a substrate (e.g., the substrate 108) on the ESC 106. The temperature controller 142 may communicate with a coolant assembly 146 to control coolant flow through the channels 116. For example, the coolant assembly 146 may include a coolant pump and reservoir. The temperature controller 142 operates the coolant assembly 146 to selectively flow the coolant through the channels 116 to cool the ESC 106 and the heating plate 112. The temperature controller 142 may control the rate at which the coolant flows and a temperature of the coolant.

A valve 150 and pump 152 may be used to evacuate reactants from the processing chamber 102. The system controller 160 may control components of the substrate processing system 100. A robot 170 may be used to deliver substrates onto, and remove substrates from, the ESC 106. For example, the robot 170 may transfer substrates between the ESC 106 and a load lock 172. The robot 170 may be controlled by the system controller 160. The system controller 160 may control operation of the load lock 172.

Figure 2C:
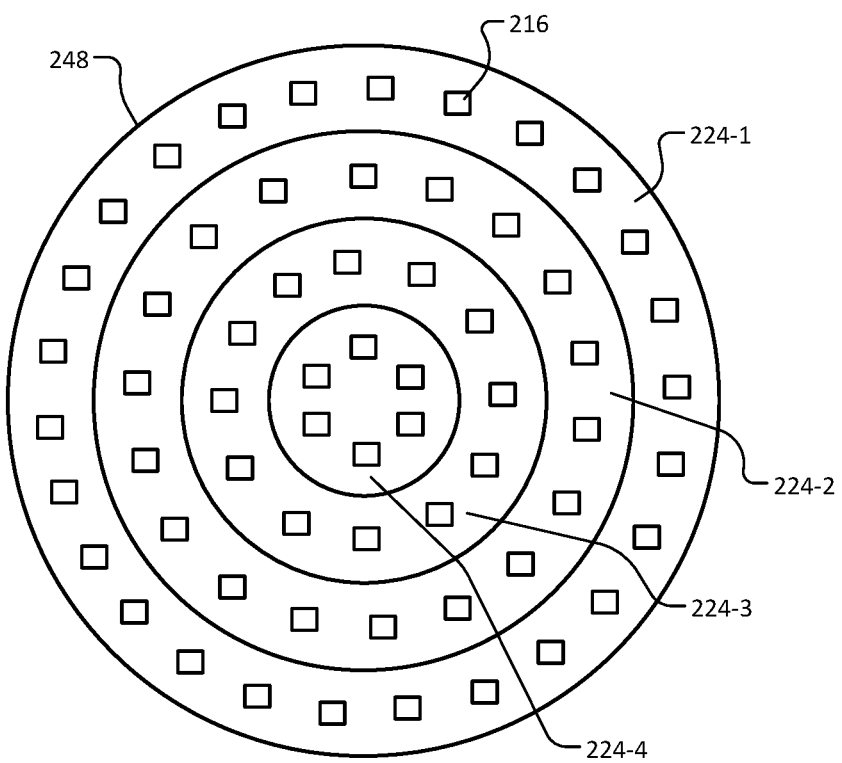
FIG. 2C is a top view of a second layer of the heating plate of the ESC including micro TCEs.

Referring now to FIGS. 2A, 2B, and 2C, an example ESC 200 having a heating plate 202 is shown. The ESC 200 may be an example of the ESC 106 of FIG. 1 and/or may replace the ESC 106 of FIG. 1. A temperature controller 204 may communicate with and/or supply electrical current and/or other control effort to TCEs of the heating plate 202 via one or more conductive elements 208 (e.g., electrical connections, wires, cables, etc.). The term "control effort" may refer to an amount of current, voltage, power, frequency, duty cycle and/or other controlled parameter of the TCEs (or actuators). The TCEs may include macro TCEs 212-1, 212-2, 212-3, and 212-4 (collectively macro TCEs 212) and micro TCEs 216. The macro TCEs 212 may be on a different layer than the micro TCEs 216. The temperature controller 204 may also be connected to and receive temperature feedback signals from detectors 218, which are connected to temperature probes 220 (also referred to as sensor elements). The temperature probes 220 are in respective macro zones 224-1, 224-2, 224-3, . . . , 224-N (collectively macro zones 224), where N is an integer. Although in FIG. 2B four macro zones are shown, the heating plate 202 may include any number of macro zones. Although, in FIG. 2B probes 220 are shown as one per detector 218, there may be multiple detectors per zone for redundancy and/or for averaging to reduce variability due to sensor construction, calibration, and/or spatial variation in macro zones 224.

As shown, the heating plate 202 includes macro zones 224-1, 224-2, 224-3, and 224-4. The temperature probes 220 are located respectively in the macro zones 224. Also, each of the macro TCEs 212 is located respectively in the macro zones 224.

The ESC 200 may include: a baseplate 228 having coolant channels 232; a thermal resistance layer 236 formed on the baseplate 228; and the heating plate 202 formed on the thermal resistance layer 236. The heating plate 202 may include multiple bonded layers, including a first layer 244 as shown in FIG. 2A and a second layer 248 as shown in FIG. 2B. The first layer 244 includes the macro TCEs 212 and the second layer 248 includes the micro TCEs 216. As shown, the macro TCEs 212 and the first layer 244 are shown arranged above the micro TCEs 216 and the second layer 248. As an alternative the second layer 248 may be arranged on the first layer 244.

The temperature controller 204 controls the macro TCEs 212 according to predetermined setpoint temperatures. For example only, the temperature controller 204 may control the macro TCEs 212 to provide a same setpoint temperature for one or more of the macro zones 224 and/or different respective setpoint temperatures for each of the macro zones 224. The setpoint temperatures for each of the macro zones 224 may vary across different processes and different steps of each process. The temperature controller 204 controls the macro TCEs 212 for each of the zones 224 based on the respective setpoint temperatures and temperature feedback signals provided by the detectors 218. For example, the temperature controller 204 individually adjusts power (e.g., current) provided to each of the macro TCEs 212 to achieve the setpoint temperatures. The macro TCEs 212 may each include a single resistive coil or other structure schematically represented by the dashed lines of FIG. 2B. Accordingly, adjusting one of the macro TCEs 212 affects the temperature of the entire respective macro zone and other macro zones. The temperature probes 220 may provide temperature feedback for only a local portion of each of the macro zones 224. For example only, the temperature probes 220 may be positioned in a portion of each macro zone 224 previously determined to have a closest correlation to an average temperature of the macro zone 224.

The temperature controller 204 may also individually control each of the micro TCEs 216 to locally adjust temperatures of the macro zones 224. For example, although each micro TCE 216 may be located entirely within one of the zones 224, adjusting a thermal output of any one of the micro TCEs 216 may have a thermal impact across multiple macro zones 224 and localities of the heating plate 202. Accordingly, one or more of the micro TCEs 216 may be selectively activated and/or deactivated to further adjust temperatures of the macro zones 224.

The temperature controller 204 may adjust current, voltage, and/or power provided to the TCEs 212, 216 when controlling temperatures of (i) the macro zones 224, and/or (ii) portions of the macro zones 224. The temperature controller 204 may activate adjust current to one or more of the micro TCEs 216 during process steps to compensate for non-uniformities in the macro zones 224 of the heating plate 202. Although FIG. 2B shows a particular number of micro TCEs 216, the heating plate 202 may include any number of micro TCEs 216. As an example, the heating plate 202 may include 100-150 micro TCEs.

Figure 3:
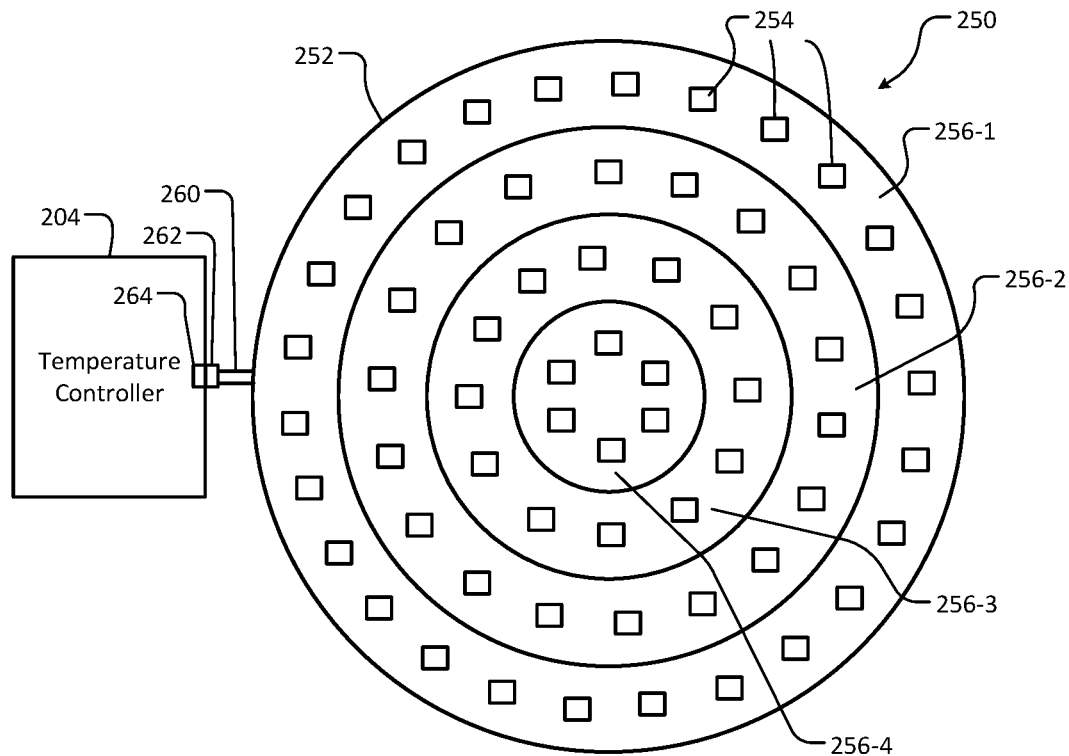
FIG. 3 is a top view of a sensor array in accordance with the present disclosure.

FIG. 3 shows an example sensor array 250. The sensor array 250 may be set on an ESC (e.g., the ESC 106 or ESC 200 of FIGS. 1 and 2) during calibration of the ESC. The sensor array 250 includes a substrate 252 having sensors 254 that are distributed across the sensor array 250. The substrate 252 may be formed of similar materials as one or more substrates to be processed on the ESC. Although the sensor array 250 is shown as having a same number of sensors as there are micro TCEs 216 in the second layer 248 of FIG. 2C, the sensor array 250 may have a different number of sensors. The sensor array 250 may include any number of sensors. As an example, the sensor array 250 may include 65 sensors. The sensor array 250 may be configured to have macro zones 256, which are similar in size and shape as the macro zones 224 of FIG. 2. The sensor array 250 may include any number of macro zones. The sensors 254 may be connected to the temperature controller 204 via conductive elements 260 and connectors 262, 264. The sensor array 250 is shown as including discrete sensors but may alternatively or in addition include a temperature sensitive material. Temperatures of the temperature sensitive material may be monitored. The temperature sensitive material may include a thermoplastic. The sensor array 250 may include an infrared (IR) image sensor and/or detect film loss from a temperature sensitive process.

Figure 4:
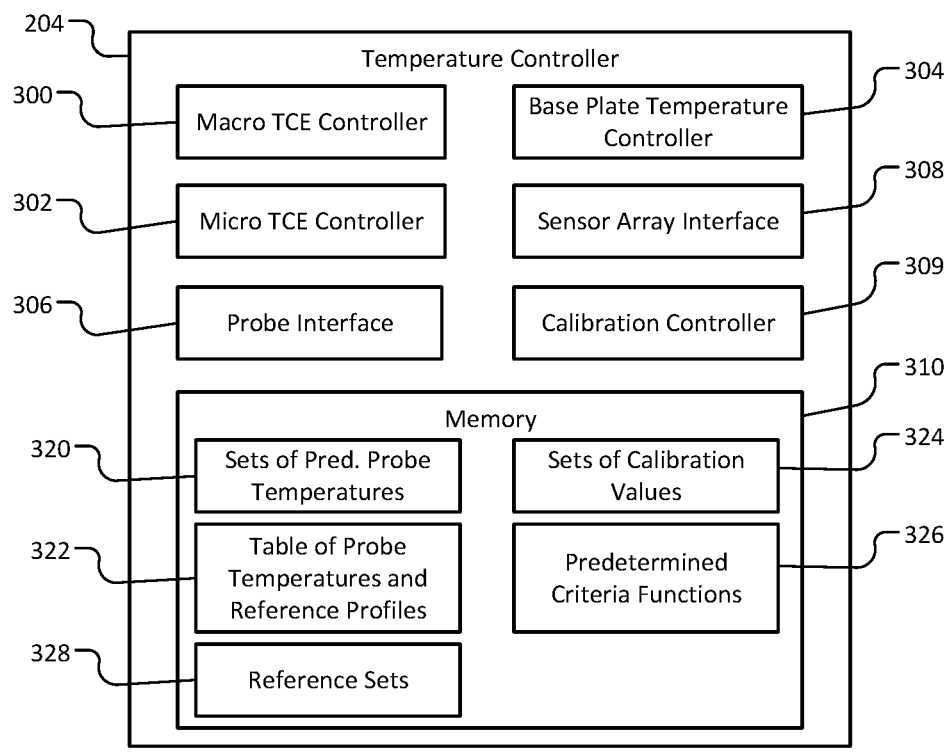
FIG. 4 is a functional block diagram of a temperature controller in accordance with the present disclosure.

FIG. 4 shows the temperature controller 204. The temperature controller 204 may include a macro TCE controller 300, a micro TCE controller 302, a base plate temperature controller 304, a probe interface 306, a sensor array interface 308, a calibration controller 309, and a memory 310. The controllers 204, 300, 302 may be, for example, proportional integral derivative (PID) controllers. The PID controllers may convert requested temperatures to various parameters (current, voltage, power, flow rates, etc.) to provide the requested temperatures. The macro TCE controller 300 may be used to control temperatures of macro TCEs including selecting current levels, voltages, and/or power supplied to the macro TCEs. The micro TCE controller 302 may be used to control temperatures of micro TCEs including selecting current levels, voltages, and/or power supplied to the micro TCEs. The base plate temperature controller 304 may control flow rates of coolant and temperatures of the coolant supplied to channels of a base plate of an ESC. The stated control provided by the controllers 300, 302, 304 may be provided during calibration of an ESC and/or during substrate processing.

The probe interface 306 may be connected to detectors (e.g., the detectors 218 of FIG. 2A) and/or other sensors connected to and/or disposed in a heating plate of an ESC. The probe interface 306 may receive feedback signals from the detectors and/or other sensors. The probe interface 306 may filter and/or signal process the feedback signals. The sensor array interface 308 may receive signals from sensors in a sensor array (e.g., the sensor array 250 of FIG. 3). The sensor array interface 308 may filter and/or signal process the received signals from the sensors in the sensor array. The calibration controller 309 may determine calibration values, as further described below.

The memory 310 may store: temperatures detected during calibration and/or substrate processing; parameters used during calibration and/or substrate processing; and/or other information. For example, the memory 310 may store: sets of predetermined probe temperatures 320; reference profiles 322 of temperatures detected by sensors of a sensor array; sets of calibration values 324; predetermined criteria functions 326; and reference sets 328. The predetermined criteria functions 326 and reference sets 328 are described below with respect to the method of FIG. 5.

Figure 5:
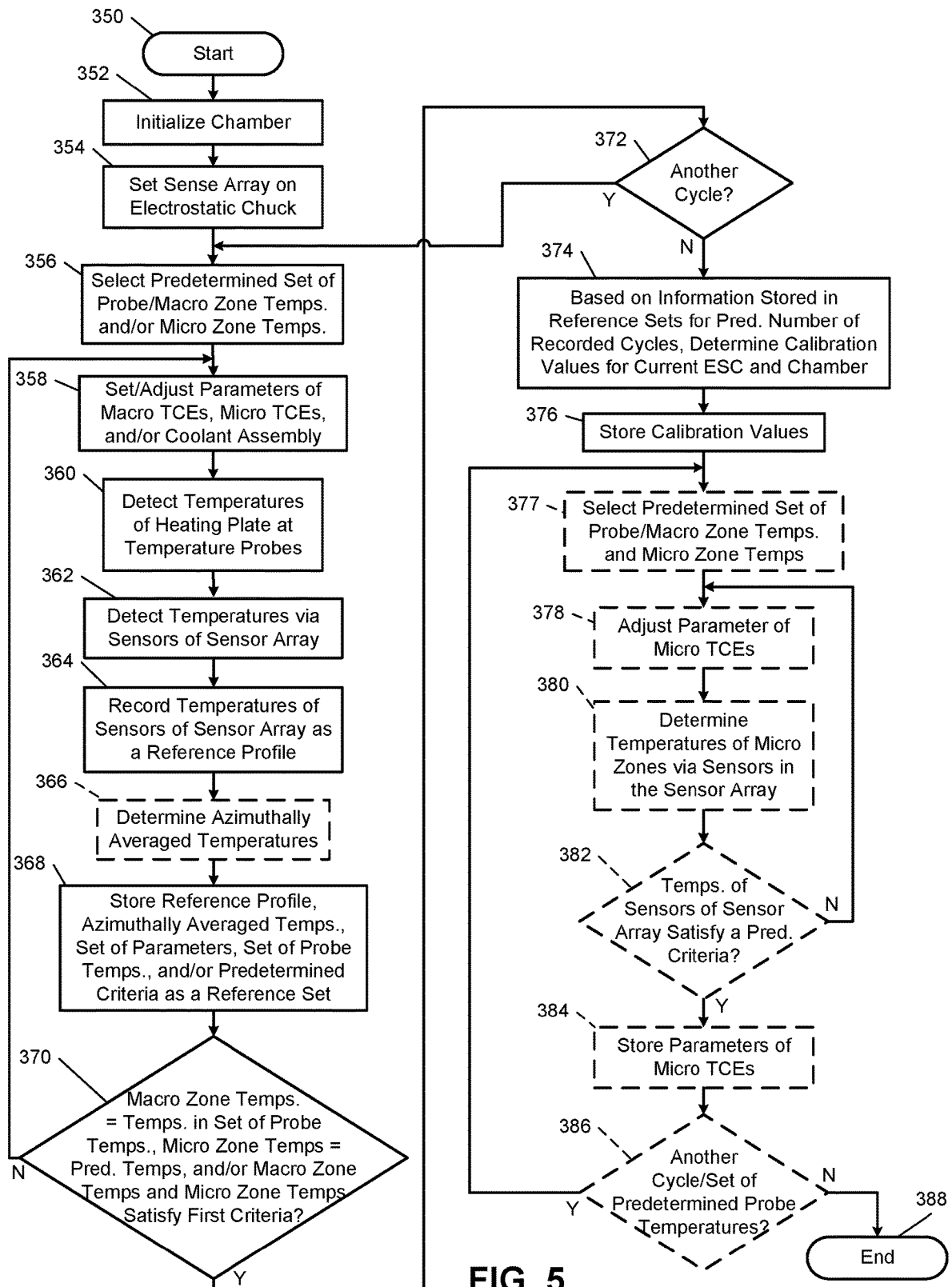
FIG. 5 illustrates a calibration method in accordance with the present disclosure.
Figure 6:
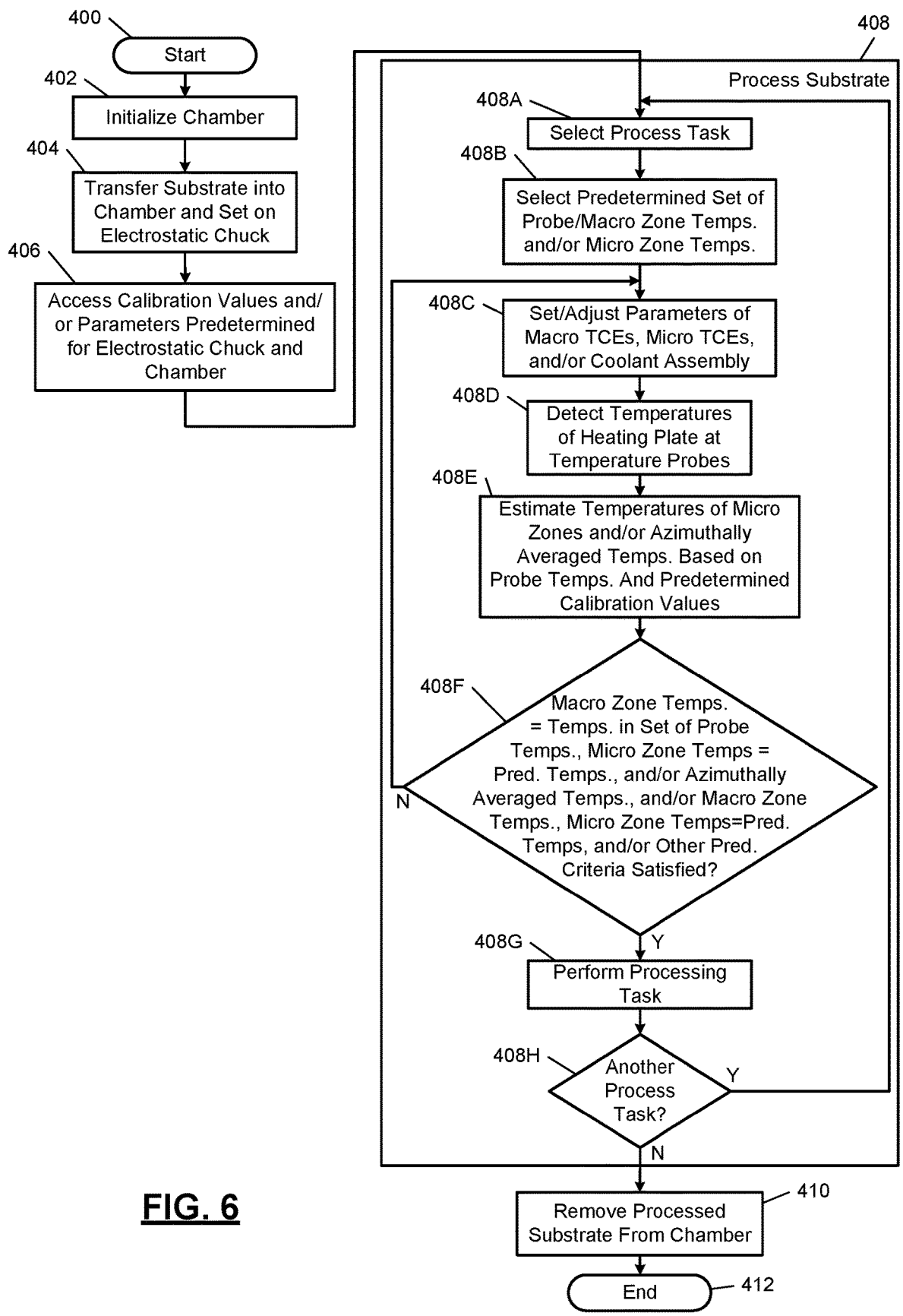
FIG. 6 illustrates a processing method in accordance with the present disclosure.

The systems disclosed herein may be operated using numerous methods, example methods are illustrated in FIGS. 5-6. In FIG. 5, a calibration method is shown. Although the following tasks are primarily described with respect to the implementations of FIGS. 1-4, the tasks may be easily modified to apply to other implementations of the present disclosure. The tasks may be iteratively performed.

The method may begin at 350. At 352, a processing chamber may be initialized for calibration of an ESC (e.g., one of the ESCs 106 or 200). This may include setting up the ESC within a processing chamber and preparing conditions within the processing chamber to be similar to conditions associated with processing a substrate. At 354, a sensor array, such as the sensor array 250, is set on the ESC.

At 356, the temperature controller (e.g., the temperature controller 204) or other controller (e.g., the system controller 160) selects a set of predetermined probe (or macro zone) temperatures and/or micro zone temperatures. In one embodiment, only macro zone temperatures are selected, not micro zone temperatures. The set of macro and/or micro temperatures are temperatures that the temperature controller is to attempt to match during tasks 358-362 by controlling macro TCEs, micro TCEs, and/or base plate characteristics.

At 358, a macro controller and/or the micro controller (e.g., one of the controllers 300, 302) sets and/or adjusts the parameters of the macro TCEs, the micro TCEs and/or the base plate. This may include adjusting: current, voltage and/or power levels of the macro TCEs; current, voltage and/or power levels of the micro TCEs; and/or flow rates and coolant temperatures of the base plate. The adjustments may be based on differences between (i) the set of predetermined probe (or macro zone) temperatures and micro zone temperatures and (ii) temperatures of the heating plate as detected by temperature probes and/or sensors of a sensor array (e.g., the sensor array 250 of FIG. 3). As an example, a predetermined criterion may include adjusting the parameters to minimize these differences. The parameters may also be adjusted to satisfy other predetermined criteria. As another example, an average of the stated differences may be calculated, and the parameters may be adjusted to minimize the average difference. As yet another example, each of the differences may be squared and summed. The result of the summation may be divided by the number of differences calculated to provide a "sum square error". The parameters may be adjusted to minimize the sum square error. The differences, the average of the differences, and/or the sum square error may be provided for: only the macro zones; only the micro zones; some or all of the macro zones; some or all of the micro zones; and/or a portion of the macro zones and the micro zones. The criteria may include minimizing errors in one or more macro and/or micro zones of the heating plate.

At 360, temperatures of the heating plate at the temperature probes are detected. At 362, temperatures of the sensor array are detected via the sensors of the sensor array. At 364, the temperatures of the heating plate and the sensor array determined at 360, 362 are recorded as a reference profile in the memory 310. Tasks 360, 362, 364 may be performed by the temperature controller.

At 366, azimuthally averaged temperatures may be determined. This may include, for each of the temperature probes, averaging temperatures indicated by sensors on and/or adjacent to a radius of the corresponding temperature probe. For example, for the temperature probe in the macro zone 224-1, the temperatures indicated by the sensors of the sensor array in the macro zone 256-1 may be averaged to provide an azimuthally average temperature APV.

At 368, the temperature control controller may store as a reference set in a memory (e.g., the memory 310): the set of predetermined probe temperatures; the reference profiles; the azimuthally average temperatures; the parameters of the macro TCEs, the micro TCEs, and/or the base plate; and/or the first predetermined criteria.

At 370, the temperature controller determines whether: the temperatures as detected via the temperature probes match and/or are within predetermined ranges of the set of predetermined probe (or macro zone) temperatures selected at 356; the temperatures as detected via the sensors of the sensor array match and/or are within predetermined ranges of the micro zone temperatures selected at 356; and/or the temperatures as detected via the temperature probes and the sensors of the sensor array satisfy other criteria. The other criteria may include providing an average, an error value, and/or a sum square error that is within a predetermined range. The other criteria may include determining and minimizing a distribution of errors (e.g., $e_{i,p}=APV_{i,p}-T_{i,p}$) across the heating plate. If the detected temperatures match, are within the predetermined ranges and/or satisfy the first predetermined criteria, then task 372 is performed, otherwise task 358 is performed. In one embodiment, the temperature controller determines whether the temperatures as detected via the temperature probes match and/or are within predetermined ranges of the set of predetermined probe (or macro zone) temperatures and does not determine whether the temperatures as detected via the sensors of the sensor array match and/or are within predetermined ranges of the micro zone temperatures.

At 372, the temperature controller may determine whether another cycle or set of predetermined probe temperatures are to be selected. A cycle may refer to performance of tasks 356-370. The number of cycles performed may be equal to a number of unknowns to be determined per row of matrices used at 374 (e.g., matrices of below equations 6, 8). If another set is to be selected, task 356 may be performed; otherwise task 374 may be performed.

At 374, a calibration controller (e.g., the calibration controller 309) determines calibration values for the ESC and processing chamber based on any and/or all of the information included in the reference sets determined during cycles of tasks 356-372. The determination of the calibration values may be based on and determined using equations 4-6 and/or 5, 7, 8. Although the matrices are shown as having a certain number of entries, the number of entries may be different if a different number of probes, macro zones, micro zones, azimuthally averaged points, and/or arbitrarily selected points are monitored. The variables PV, OFFSET, SPAN, APV, T are defined above with respect to equations 1-3. Each of equations 4 and 7 includes a probe temperature and base plate matrix X, a contribution (or unknown) matrix β, and an azimuthally averaged temperature (or arbitrary point) matrix Y. The values of the contribution matrix β refer to contributions of thermal energy from each of the macro zones for a temperature detected by one of the probes. The arbitrary points refer to points on a top surface of an ESC and are designated by the variable $AP_{M,N}$, where M and N are integers. The number of unknowns per row of the matrices of equations 6, 8 is six. As a result, 6 cycles may have been performed. The unknown values are the SPAN and OFFSET values. This includes determining terms of diagonals of the contribution/SPAN matrices of equations 6, 8 and off diagonal terms of the contribution/SPAN matrices of equations 6, 8.

$$\begin{bmatrix} 1 & PV_{1,1} & PV_{1,2} & PV_{1,3} & PV_{1,4} & BP_1 \\ & & \vdots & & & \\ 1 & PV_{M,1} & PV_{M,2} & PV_{M,3} & PV_{M,4} & BP_M \end{bmatrix} * \quad (4)$$

$$\begin{bmatrix} OFFSET_1 & OFFSET_2 & OFFSET_3 & OFFSET_4 \\ SPAN_{1:1,1} & SPAN_{1:2,1} & SPAN_{1:3,1} & SPAN_{1:4,1} \\ SPAN_{1:1,2} & SPAN_{1:2,2} & SPAN_{1:3,2} & SPAN_{1:4,2} \\ SPAN_{1:1,3} & SPAN_{1:2,3} & SPAN_{1:3,3} & SPAN_{1:4,3} \\ SPAN_{1:1,4} & SPAN_{1:2,4} & SPAN_{1:3,4} & SPAN_{1:4,4} \\ SPAN_{2:1} & SPAN_{2:2} & SPAN_{2:3} & SPAN_{2:4} \end{bmatrix} =$$

$$\begin{bmatrix} APV_{1,1} & APV_{1,2} & APV_{1,3} & APV_{1,4} \\ & \vdots & & \\ APV_{M,1} & APV_{M,2} & APV_{M,3} & APV_{M,4} \end{bmatrix} \rightarrow X*\beta = Y$$

$$\beta_p = (X_p^T * X_p)^{-1} * X_p^T * Y_p \quad (5)$$

$$\begin{bmatrix} T_{1,i} \\ T_{2,i} \\ T_{3,i} \\ T_{4,i} \end{bmatrix} = \begin{bmatrix} SPAN_{1:1,1} & SPAN_{1:1,2} & SPAN_{1:1,3} & SPAN_{1:1,4} \\ SPAN_{1:2,1} & SPAN_{1:2,2} & SPAN_{1:2,3} & SPAN_{1:2,4} \\ SPAN_{1:3,1} & SPAN_{1:3,2} & SPAN_{1:3,3} & SPAN_{1:3,4} \\ SPAN_{1:4,1} & SPAN_{1:4,2} & SPAN_{1:4,3} & SPAN_{1:4,4} \end{bmatrix} * \quad (6)$$

$$\begin{bmatrix} PV_{1,i} \\ PV_{2,i} \\ PV_{3,i} \\ PV_{4,i} \end{bmatrix} + \begin{bmatrix} SPAN_{2:1} \\ SPAN_{2:2} \\ SPAN_{2:3} \\ SPAN_{2:4} \end{bmatrix} * BP_i + \begin{bmatrix} OFFSET_1 \\ OFFSET_2 \\ OFFSET_3 \\ OFFSET_4 \end{bmatrix}$$

Equations 6, 8 are linear equations without the offset matrices. Equations 6, 8 are affine equations with the offset matrices. Although task 374 is primarily described using equations 4-8, task 374 may be performed using some other functional relationship between probe temperatures PV and substrate temperatures T. The arbitrary temperature matrix Y of equation 7 may include (i) any number of arbitrarily selected points, and/or (ii) azimuthally averaged temperatures. The arbitrarily selected points may refer to tips of the probes, locations of the sensors in the sense array, and/or other points within and/or across the top surface of the ESC. The azimuthally averaged temperatures may be for any number of radii measured from a longitudinal center axis. The number of azimuthally averaged temperatures may be greater than the number of probes. The longitudinal center axis may extend vertically through a center of the ESC and the sensor array.

$$\begin{bmatrix} 1 & PV_{1,1} & PV_{1,2} & PV_{1,3} & PV_{1,4} & BP_1 \\ & & \vdots & & & \\ 1 & PV_{M,1} & PV_{M,2} & PV_{M,3} & PV_{M,4} & BP_M \end{bmatrix} * \quad (7)$$

$$\begin{bmatrix} OFFSET_1 & OFFSET_N \\ SPAN_{1:1,1} & SPAN_{1:N,1} \\ SPAN_{1:1,2} & SPAN_{1:N,2} \\ SPAN_{1:1,3} & \cdots & SPAN_{1:N,3} \\ SPAN_{1:1,4} & SPAN_{1:N,4} \\ SPAN_{2:1} & SPAN_{2:N} \end{bmatrix} =$$

$$\begin{bmatrix} APV_{1,1} & \cdots & APV_{1,N} \\ & \vdots & \\ APV_{M,1} & \cdots & APV_{M,N} \end{bmatrix} \rightarrow X*\beta = Y$$

$$\begin{bmatrix} T_{1,i} \\ \vdots \\ T_{4,i} \end{bmatrix} = \begin{bmatrix} SPAN_{1:1,1} & SPAN_{1:1,2} & SPAN_{1:1,3} & SPAN_{1:1,4} \\ & & \vdots & \\ SPAN_{1:N,1} & SPAN_{1:N,2} & SPAN_{1:N,3} & SPAN_{1:N,4} \end{bmatrix} * \begin{bmatrix} PV_{1,i} \\ PV_{2,i} \\ PV_{3,i} \\ PV_{4,i} \end{bmatrix} + \quad (8)$$

$$\begin{bmatrix} SPAN_{2:1} \\ \vdots \\ SPAN_{2:N} \end{bmatrix} * BP_i + \begin{bmatrix} OFFSET_1 \\ \vdots \\ OFFSET_N \end{bmatrix}$$

Tasks 352-374 and/or by tasks 352-386 may be performed to attempt to match the detected temperatures T to the APV temperatures and/or the AP temperatures.

At 376, the calibration values including the determined SPAN and OFFSET values are stored. The calibration values may be used at a later time for estimating temperatures of a substrate during substrate processing, such as during the method of FIG. 6. The following tasks 377-386 may be performed, for example, to fine tune the calibration performed during tasks 356-376. This is especially true if temperatures of the micro zones were not monitored and/or accounted for during tasks 356-376.

At 377, the temperature controller may select a predetermined set of probe (or macro zone) temperatures and micro zone temperatures. During cycles of tasks 377-386, these temperatures may be the same, similar to, or different than the temperatures selected during the cycles of tasks 356-374.

At 378, parameters of the micro TCEs are adjusted. These adjustments may be performed in a similar manner as the adjustments performed at 358. The adjustments may also be based on differences between detected and predetermined temperatures, squares of the differences, a sum square error, and/or other criteria.

At 380, the micro TCE controller determines temperatures of the micro zones via the sensors of the sensor array. At 382, if the temperatures of the micro zones match and/or are within predetermined ranges of the micro zone temperatures selected at 377 and/or other criteria is satisfied, task 384 is performed, otherwise task 378 is performed. The other criteria may include determining an average of differences, an average of squared differences, and/or other calculations. The other criteria may include providing an average, an error value, and/or a sum square error that is within a predetermined range. The criteria used at task 382 may be different than the criteria used at 366.

At 384, the parameters used to control the micro TCEs to satisfy the criteria of task 382 are stored. These parameters may be used in addition to the parameters stored at 374 when processing a substrate to provide a selected temperature distribution profile across the substrate. The parameters stored at 374 and 384 may be used to provide a basis for estimating temperatures of a substrate during substrate processing.

At 386, the temperature controller determines whether another cycle is to be performed and/or another set of predetermined macro and micro zone temperatures is to be selected. If another cycle is to be performed task 377 is performed, otherwise the method may end at 388. The method may end at 388.

FIG. 6 shows a substrate processing method. Although the following tasks are primarily described with respect to the implementations of FIGS. 1-5, the tasks may be easily modified to apply to other implementations of the present disclosure. The tasks may be iteratively performed.

The method may begin at 400. At 402, a processing chamber is initialized for processing a substrate (or wafer). At 404, the substrate is placed on an ESC in the processing chamber. At 406, a temperature controller (e.g., the temperature controller 204 of FIG. 2A) may access calibration values and/or parameters determined and/or stored during the method of FIG. 5. The calibration values and parameters correspond to the ESC and the processing chamber in which the ESC is located.

At 408, the substrate is processed. At 408A, a system controller (e.g., the system controller 160) selects a processing task (e.g., deposition, etching, etc.) to be performed. At 408B, based on the processing task to be performed, the temperature controller selects a predetermined set of macro and/or micro zone temperatures. At 408C, based on the set of macro and/or micro zone temperatures, the temperature controller selects and/or adjusts parameters of macro TCEs, micro TCEs, and/or a coolant assembly.

At 408D, temperatures of a heating plate of the ESC are detected via probes (e.g., the probes 220 of FIG. 2A). At 408E, a micro TCE controller (the micro TCE controller 302) and/or the temperature controller estimates: temperatures of the micro zones; azimuthally averaged temperatures; and/or arbitrary temperatures (e.g., temperatures anywhere in the heating plate and/or in the substrate); and/or temperatures of the substrate. The micro TCE controller may determine a temperature distribution of the substrate by estimated temperatures across the substrate based on the temperatures of the micro zones; azimuthally averaged temperatures; and/or the arbitrary temperatures. This temperature estimation may be based on predetermined characteristics (materials, layout, makeup, etc.) of the substrate. The temperature estimations may be determined using any of above equations 4-8 based on the calibration values. This may be done in a linear or approximately linear fashion, as the models provided by equations 4, 5 or 6, 7 are approximately linear and/or may be used without the OFFSET values and matrices.

At 408F, the temperature controller determines whether: the temperatures as detected via the temperature probes match and/or are within predetermined ranges of the set of predetermined probe (or macro zone) temperatures selected at 408C; the estimated temperatures of the micro zones match and/or are within predetermined ranges of the micro zone temperatures selected at 408C; and/or the macro and micro temperatures satisfy a predetermined criteria. The criteria may include providing an average, an error value, and/or a sum square error that is within a predetermined range. This may include the temperature controller selecting points in the heating plate and determining azimuthally averaged temperatures based on the temperatures of the probes and/or the estimated macro and/or micro zone temperatures. If the detected temperatures match, are within the predetermined ranges and/or satisfy the predetermined criteria, then task 408G is performed, otherwise task 408C is performed.

At 408G, the processing task selected at 408A is performed. Task 408G may be performed while tasks 408B-408F are performed. At 408H, if another processing task is to be performed, task 408A is performed, otherwise task 410 is performed.

At 410, the processed substrate is removed from the processing chamber. Subsequent to task 410, the method may end at 412.

The above-described tasks of FIGS. 5-6 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

By allowing for calibration and control of an arbitrary number of points and/or radii and by accounting for temperature distributions associated with macro and micro TCEs and temperature losses associated with a base plate, the above described examples allow ESCs to be calibrated. The ESCs may be calibrated such that each of the ESCs and/or corresponding heating plates provides the same temperature control performance. For example, a first ESC may have a first set of calibration values and a second ESC may have a second set of calibration values, which are different than the first set of calibration values. Parameters of TCEs and of a coolant assembly may be adjusted differently, due to the differences in the calibration values of the TCEs to provide a same temperature distribution profile across heating plates of the ESCs and thus across corresponding substrates.

The above disclosed examples provide spatial information of heating plates by allowing contributions of any number of TCEs of a heating plate to be accounted for when determining temperatures of any number of points of a heating plate. The examples allow for temperatures of many selected points to be estimated. More points may be monitored than probes used to measure temperature. This is referred to as an under actuated state.

The above described examples allow for an arbitrary number of points at predetermined or arbitrary locations to be accounted for in an estimation of temperature at a single point. The single point may be a predetermined or arbitrarily selected point in a macro zone, a micro zone and/or other zone in a chamber. Thus, the estimation accounts for differences in processing chambers by accounting for differences in heating profiles of heating plates due to the differences in processing chambers.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For example, the macro zones in this example are concentric rings and the averaging of sensor readings is thus azimuthal, but any other shapes or relationships to each other could also be used where the averaging was over the approximate lines of equal temperature value. For example, pie shaped macro zones could be averaged over curves paralleling the edges of the macro zones. It should be understood that one or more steps within a method may be executed in different order (or concurrently) without altering the principles of the present disclosure. In addition, the examples herein may pertain directly to the thermal field T(x,y) in a plane above the ESC, but may also be extended to calibrate any volume a sensor array measures such as a volume including a plane (i) within the ESC, or (ii) obliquely above a surface (e.g., a top surface) of the ESC. Also, the temperature fields (or temperature field values) are only examples, the embodiments disclosed herein may be applied to and as a result used to set, monitor, measure, and/or adjust other scalar fields (or field values) such as deposited power values applied beneath the macro zones of an RF antenna or polymer thicknesses on a deposition surface in a reactor controlled by macro zones of a calibrated vapor delivery nozzle.

Chemical vapor deposition CVD(x,y) on a wafer or Silicon Nitride (SiNx, SiN) etch rate (ER) may be used as a function of position on the wafer SiN ER(x,y) as a field of interest. From other methodology, the SiN ER(x,y) position may be used to provide a good thermal sensitivity S, where $S(x,y,T)=\Delta SiN\ ER\ (x,y,T)/\Delta Temp(x,y,T)$, where x and y are position coordinates, and T is temperature. Hence the SiN ER divided by the sensitivity S at (x,y,T) is directly related to a temperature of a field of a wafer, which may be used as a calibration value since the result of this division has a higher spatial resolution and homogeneous point-to-point self-consistent-calibration than that provided by wafer-encapsulated-thermal-sensors.

In the above-described implementations various actuators are disclosed for affecting various fields. The actuators associated with first zones and first fields when adjusted can affect other zones and fields corresponding to the other zones. Control of first actuators for first fields and first zones (e.g., macro zones, micro zones or other zones) can affect control of second actuators for second fields and second zones (e.g., macro zones, micro zones, or other zones). The control of the first actuators and the second actuators may be feedback control or feedforward control. The control of the first actuators may be feedback control and the control of the second actuators may be feedforward control or vice versa. The control of the first actuators may be feedforward control and the control of the second actuators may be feedforward control. Thus, the control effort provided for the first actuators and the control effort provided for the second actuators is feedback and feedforward independent.

Further, various embodiments are disclosed herein. Although each of the embodiments are described as having certain features, any one or more of the features described with respect to any one embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. When a first element is adjacent to a second element, the first element may be in contact with the second element or the first element may be spaced away from the second element without any intervening element between the first element and the second element. When a first element is between a second element and a third element, the first element may be directly connected to the second element and the third element (referred to as "directly between") or intervening elements may be connected (i) between the first element and the second element, and/or (ii) between the first element and the third element. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can include semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by including one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a plurality of sensors;
an interface configured to receive a first plurality of feedback signals from the plurality of sensors, wherein at least some of the plurality of sensors are disposed in an electrostatic chuck, and wherein the first plurality of feedback signals are indicative respectively of a plurality of fields of a heating plate of the electrostatic chuck; and
one or more controllers configured to, based on the plurality of fields and a plurality of sets of calibration values, estimate values of a first field respectively for a plurality of points on a substrate,
wherein
the plurality of fields includes the first field,
each of the plurality of sets of calibration values corresponds respectively to one of a first plurality of actuators,
the plurality of sets of calibration values for each of the plurality of sensors are indicative of thermal energy contributions corresponding respectively to the first plurality of actuators,
the calibration values, in each of the plurality of sets of calibration values, define amounts of contribution provided by a respective one of the first plurality of actuators to the first field for the plurality of points,
each of the plurality of sets of calibration values includes calibration values corresponding respectively to the plurality of points, and
the one or more controllers is configured to change physical states of the first plurality of actuators based on the estimated values of the first field of the plurality of points to provide a predetermined temperature distribution profile across the electrostatic chuck.

2. The system of claim 1, wherein the one or more controllers is configured to:
select a point at a radius, wherein the radius is different than radii corresponding to locations of the plurality of sensors in a chamber;
estimate an azimuthally averaged field of the selected point based on estimates of the plurality of fields; and
estimate one or more of the values of the first field of the substrate based on the azimuthally averaged field.

3. The system of claim 1, wherein:
the one or more controllers is configured to, prior to changing the physical states of the first plurality of actuators, select a predetermined set of fields and adjust parameters of the first plurality of actuators based on the predetermined set of fields; and
the first plurality of feedback signals from the plurality of sensors are generated based on the adjusted parameters.

4. The system of claim 3, wherein the one or more controllers comprise:
a first controller configured to select the predetermined set of fields; and
a second controller configured to adjust the parameters of the first plurality of actuators based on the predetermined set of fields.

5. The system of claim 3, further comprising a chamber, wherein:
one or more controllers is configured to adjust parameters of a second plurality of actuators based on a second predetermined set of fields; and
the chamber comprises the first plurality of actuators and the second plurality of actuators.

6. The system of claim 5, wherein:
the second set of predetermined fields are based on an etch recipe; and
the etch recipe includes nominal set points for radio frequency power levels, gas flow rates, or target substrate temperatures.

7. The system of claim 5, wherein the one or more controllers is configured to:
coarsely adjust the first field of the substrate by adjusting the parameters of the first plurality of actuators; and
finely adjust the first field of the substrate by adjusting the parameters of the second plurality of actuators, wherein a field range over which the coarse adjustment occurs is greater than a field range over which the fine adjustment occurs.

8. The system of claim 5, wherein the plurality of sets of calibration values for each of the plurality of sensors are indicative of thermal energy contributions corresponding respectively to the second plurality of actuators.

9. The system of claim 8, further comprising a calibration module configured to set the plurality of sets of calibration values based on settings of the second plurality of actuators and settings of a plurality of macro-zones.

10. The system of claim 9, wherein:
the settings of the plurality of macro-zones comprise thermal control resistances of the substrate and four zone offsets; and
the four zone offsets refer to impact of the second plurality of actuators on the plurality of fields.

11. The system of claim 1, wherein some of the plurality of points on the substrate are located at the some of the plurality of sensors.

12. The system of claim 1, wherein some of the plurality of points on the substrate are not located at the some of the plurality of sensors.

13. The system of claim 1, wherein:
the plurality of sensors are disposed in a plurality of zones of a chamber, wherein a first one or more of the plurality of zones is outside the electrostatic chuck and a second one or more of the plurality of zones includes a portion of the electrostatic chuck; and
the estimated values include estimated temperatures of the plurality of zones.

14. The system of claim 1, wherein a number of actuators included in the first plurality of actuators is greater than a number of sensors in the plurality of sensors.

15. The system of claim 1, wherein:
the first plurality of actuators are in a first plurality of zones of the electrostatic chuck;
the plurality of sensors and the first plurality of actuators are disposed in the electrostatic chuck; and
a number of actuators in each of the first plurality of zones is greater than a number of sensors in the electrostatic chuck.

16. The system of claim 1, wherein:
the plurality of sensors include temperature probes; and
the one or more controllers is configured to
estimate an azimuthally averaged temperature based on (i) temperatures indicated by the temperature probes, and (ii) the plurality of sets of calibration values for each of the plurality of sensors, and
adjust operation of the first plurality of actuators based on the azimuthally averaged temperatures.

17. The system of claim 1, wherein at least some of the first plurality of actuators are implemented in the electrostatic chuck.

18. The system of claim 1, wherein the one or more controllers is configured to, subsequent to generating the plurality of calibration values and during the processing of the substrate, adjust at least one of current, voltage, frequency or duty cycle of the first plurality of actuators to change the physical states of the first plurality of actuators based on the estimated values.

19. The system of claim 1, Therein the plurality of points are located respectively at the plurality of sensors.

20. A system comprising:
a plurality of sensors;
an interface configured to receive a first plurality of feedback signals from the plurality of sensors, wherein at least some of the plurality of sensors are disposed in an electrostatic chuck, and wherein the first plurality of feedback signals are indicative respectively of a plurality of fields of a heating plate of the electrostatic chuck; and
one or more controllers configured to, based on the plurality of fields and a plurality of sets of calibration values, estimate values of a first field respectively for a plurality of points on a substrate,
wherein
the plurality of fields includes the first field,
each of the plurality of sets of calibration values corresponds respectively to one of a first plurality of actuators,
the calibration values, in each of the plurality of sets of calibration values, define amounts of contribution provided by a respective one of the first plurality of actuators to the first field for the plurality of points, and
the one or more controllers is configured to change physical states of the first plurality of actuators based on the estimated values of the first field of the plurality of points to provide a predetermined temperature distribution profile across the electrostatic chuck,
the plurality of sensors include a first sensor,
the first plurality of actuators include a first actuator and a second actuator,
the plurality of sets of calibration values for the first sensor include a first calibration value and a second calibration value,
the first calibration value of the first sensor is proportional to an amount of contribution provided by the first actuator to the one of the plurality of fields, and
the second calibration value of the first sensor is proportional to an amount of contribution provided by the second actuator to the one of the plurality of fields.

* * * * *